(12) United States Patent
Ron et al.

(10) Patent No.: US 9,001,983 B2
(45) Date of Patent: Apr. 7, 2015

(54) DIGITAL PHOTO FRAME WITH DIAL-A-TAG FUNCTIONALITY

(71) Applicant: Google Inc., Mountain View, CA (US)

(72) Inventors: Uri Ron, Kfar Saba (IL); Ran Ne'man, Ramat Gan (IL); Sigalit Klimovsky, Tel Aviv (IL); Eyal Bychkov, Hod Hasharon (IL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/020,843

(22) Filed: Sep. 8, 2013

(65) Prior Publication Data

US 2014/0011545 A1 Jan. 9, 2014

Related U.S. Application Data

(62) Division of application No. 13/612,863, filed on Sep. 13, 2012, now Pat. No. 8,548,134, which is a division of application No. 12/349,522, filed on Jan. 7, 2009, now Pat. No. 8,294,454.

(51) Int. Cl.
| | |
|---|---|
| *H04M 11/00* | (2006.01) |
| *H04M 3/44* | (2006.01) |
| *G06F 3/0482* | (2013.01) |
| *G06F 3/147* | (2006.01) |
| *H04M 1/2745* | (2006.01) |
| *H04N 5/45* | (2011.01) |
| *H04N 21/4728* | (2011.01) |

(Continued)

(52) U.S. Cl.
CPC ............... *H04M 3/44* (2013.01); *G06F 3/0482* (2013.01); *G06F 3/147* (2013.01); *G09G 2354/00* (2013.01); *G09G 2380/16* (2013.01); *H04M 1/27455* (2013.01); *H04N 5/45* (2013.01); *H04N 2005/4425* (2013.01); *H04N 2005/443* (2013.01); *H04N 21/4728* (2013.01); *H04N 21/478* (2013.01)

(58) Field of Classification Search
CPC ............ H04M 1/27455; H04M 1/575; H04M 3/42042; H04M 2201/38
USPC ........................................................ 379/93.23
See application file for complete search history.

(56) References Cited

U.S. PATENT DOCUMENTS

| | | |
|---|---|---|
| 5,625,673 A | 4/1997 | Grewe et al. |
| 5,628,055 A | 5/1997 | Stein |
| 5,809,115 A | 9/1998 | Inkinen |

(Continued)

FOREIGN PATENT DOCUMENTS

| | | |
|---|---|---|
| EP | 1871075 A1 | 12/2007 |
| JP | 09-083630 A | 3/1997 |

(Continued)

*Primary Examiner* — Simon Sing
(74) *Attorney, Agent, or Firm* — Soquel Group LLC

(57) ABSTRACT

A method for communication using a digital photo frame, including rendering a digital photo with a plurality of different objects appearing in the photo, the digital photo having one or more name tags associated therewith, wherein a name tag for a digital photo corresponds to an object appearing in the photo, receiving a user input phone call command for any selected one of the name tags associated with the rendered digital photo, and in response to the receiving: automatically determining a phone number for the object corresponding to the selected name tag, and automatically dialing the phone number for the object corresponding to the selected name tag.

10 Claims, 11 Drawing Sheets

(51) Int. Cl.
*H04N 21/478* (2011.01)
*H04N 5/44* (2011.01)

(56) References Cited

U.S. PATENT DOCUMENTS

| | | | |
|---|---|---|---|
| 5,875,239 A | 2/1999 | Koralewski et al. | |
| 5,893,037 A | 4/1999 | Reele et al. | |
| 5,907,815 A | 5/1999 | Grimm et al. | |
| 6,084,951 A * | 7/2000 | Smith et al. | 379/93.17 |
| 6,188,917 B1 | 2/2001 | Laureanti | |
| 6,201,867 B1 | 3/2001 | Koike | |
| 6,243,578 B1 | 6/2001 | Koike | |
| 6,477,357 B1 | 11/2002 | Cook | |
| 6,516,202 B1 | 2/2003 | Hawkins et al. | |
| 6,640,113 B1 | 10/2003 | Shim et al. | |
| 6,690,947 B1 | 2/2004 | Tom | |
| 6,898,283 B2 | 5/2005 | Wycherley et al. | |
| 6,907,264 B1 | 6/2005 | Sterkel | |
| 6,999,792 B2 | 2/2006 | Warren | |
| 7,085,542 B2 | 8/2006 | Dietrich et al. | |
| 7,194,285 B2 | 3/2007 | Tom | |
| 7,196,718 B1 | 3/2007 | Barbeau et al. | |
| 7,206,612 B2 | 4/2007 | Suzuki | |
| 7,266,391 B2 | 9/2007 | Warren | |
| 7,477,919 B2 | 1/2009 | Warren | |
| 7,505,579 B2 | 3/2009 | Choi | |
| 7,515,937 B2 | 4/2009 | Lee | |
| 7,561,675 B2 * | 7/2009 | Luft et al. | 379/88.13 |
| 7,606,564 B2 | 10/2009 | Jin | |
| 7,620,058 B2 | 11/2009 | Gorti et al. | |
| 7,831,141 B2 | 11/2010 | Wassingbo et al. | |
| 8,208,618 B2 | 6/2012 | Bae et al. | |
| 2001/0027098 A1 | 10/2001 | Suzuki | |
| 2002/0090980 A1 | 7/2002 | Wilcox et al. | |
| 2002/0151327 A1 | 10/2002 | Levitt | |
| 2004/0102225 A1 * | 5/2004 | Furuta et al. | 455/566 |
| 2004/0184596 A1 | 9/2004 | Choi | |
| 2004/0233930 A1 | 11/2004 | Colby, Jr. | |
| 2004/0237048 A1 * | 11/2004 | Tojo et al. | 715/745 |
| 2004/0268005 A1 | 12/2004 | Dickie | |
| 2005/0159184 A1 | 7/2005 | Kerner et al. | |
| 2005/0181774 A1 | 8/2005 | Miyata | |
| 2006/0003804 A1 | 1/2006 | Liu | |
| 2006/0031897 A1 | 2/2006 | Pulitzer | |
| 2006/0105722 A1 | 5/2006 | Kumar | |
| 2006/0170669 A1 | 8/2006 | Walker et al. | |
| 2006/0190321 A1 | 8/2006 | Martins Nicho et al. | |
| 2006/0241353 A1 | 10/2006 | Makino et al. | |
| 2007/0004450 A1 | 1/2007 | Parikh | |
| 2007/0018957 A1 | 1/2007 | Seo | |
| 2007/0079030 A1 | 4/2007 | Okuley et al. | |
| 2007/0081643 A1 | 4/2007 | Divine | |
| 2007/0161404 A1 | 7/2007 | Yasujima et al. | |
| 2007/0288583 A1 | 12/2007 | Rensin et al. | |
| 2007/0296739 A1 | 12/2007 | Lonn | |
| 2008/0009325 A1 | 1/2008 | Zinn et al. | |
| 2008/0040354 A1 | 2/2008 | Ray et al. | |
| 2008/0040716 A1 | 2/2008 | Lam et al. | |
| 2008/0140886 A1 | 6/2008 | Izutsu | |
| 2008/0263457 A1 * | 10/2008 | Kim et al. | 715/753 |
| 2008/0299905 A1 | 12/2008 | Kumar | |
| 2009/0006484 A1 | 1/2009 | Wang | |
| 2009/0197621 A1 | 8/2009 | Book | |
| 2009/0268888 A1 * | 10/2009 | Hsu et al. | 379/93.23 |
| 2009/0290697 A1 | 11/2009 | Adams | |
| 2009/0318194 A1 | 12/2009 | Alberth, Jr. | |

FOREIGN PATENT DOCUMENTS

| | | |
|---|---|---|
| WO | 9421058 A1 | 9/1994 |
| WO | 0059247 A1 | 10/2000 |
| WO | 0186922 A1 | 11/2001 |
| WO | 03103174 A1 | 12/2003 |

* cited by examiner

DIGITAL PHOTO FRAME WITH DIAL-A-TAG FUNCTIONALITY

CROSS REFERENCE TO RELATED APPLICATIONS

This application is a divisional of assignee's co-pending application U.S. Ser. No. 13/612,863, entitled DIGITAL PHOTO FRAME WITH DIAL-A-TAG FUNCTIONALITY, filed on Sep. 13, 2012 by inventors Uri Ron, Ran Ne'man, Sigalit Klimovsky and Eyal Bychkov. U.S. Ser. No. 13/612,863 is a divisional of assignee's application U.S. Ser. No. 12/349,522, entitled DIGITAL PHOTO FRAME WITH DIAL-A-TAG FUNCTIONALITY, now U.S. Pat. No. 8,295,454, filed on Jan. 7, 2009 by inventors Uri Ron, Ran Ne'man, Sigalit Klimovsky and Eyal Bychkov.

FIELD OF THE INVENTION

The present invention relates to wireless communication and digital photo frames.

BACKGROUND OF THE INVENTION

Most digital photo organizers today associate tags with photos from a user's digital photo archive. A tag is a keyword used to describe and categorize a photo. When digital photos are tagged, a user can issue a search query having one or more tags, and the digital photo organizer searches for all digital photos having the one or more tags associated therewith.

Tags are especially useful for identifying objects appearing in digital photos. Objects may be inter alia people, business establishments, organizations, governments and municipalities, geographical sites, entertainment services and information services. Such tags are referred to as "name tags". If photos are tagged with name tags corresponding to objects appearing therein, then a user can easily search for and locate all of his photos in which a designated object appears, even for very large digital photo archives. Many familiar web-based image applications and social networks use name tags, including Picasa® Web Albums operated by Google Inc. of Mountainview, Calif., and Facebook® operated by Facebook, Inc. of Palo Alto, Calif.

Tagging photos with tags corresponding to objects may be done manually by a user, automatically by object recognition software such as the OKAO Vision™ face sensing software developed and marketed by OMRON Corporation of Kyoto, Japan, or the Face Sensing Engine developed and marketed by Oki Electric Industry Co., Ltd. of Tokyo, Japan.

A "digital photo frame" is an electronic device that presents digital photos in a photo frame, generally in a slide show fashion with an adjustable transition time. Digital photo frames include a video engine and microprocessor which processes JPEG images, controls power management, and controls a user interface. Some digital photo frames also support movie clips, audio and text. For such digital photo frames, the video engine and microprocessor also decodes MPEG videos and handles audio processing for up to two channels, the audio processing including digital to analog audio conversion and audio amplification.

Digital photo frames are controlled via a user interface. The user interface may include buttons, remote control, and touch control. The Shogo SG 080 digital photo frame manufactured and distributed by RealEase Limited of Hong Kong, and the Ality PF-T150 digital photo frame manufactured and distributed by Mustek, Inc. of Taiwan have touch-sensitive display screens.

Many digital photo frames include internal memory for storing digital photos. Such digital photo frames generally enable users to load photos to the memory via a USB connection. Many digital frames are able to render and display digital photos directly from a camera memory card.

Some digital photo frames are networked and support wireless communication such as Wi-Fi or broadband or phone line. Such digital photo frames load photos over the Internet from RSS feeds, from e-mail attachments, and from photo sharing sites such as Flickr® operated by Yahoo! Inc of Sunnyvale, Calif., and Picasa® Web Albums. Ceiva Logic, Inc. of Burbank, Calif. manufactures and distributes a digital photo frame, and offers PicturePlan®, which is a monthly service for downloading photos over a phone line. The Ceiva digital photo frame optionally supports wireless connectivity. Sony Corporation of Tokyo, Japan manufactures and distributes a VAIO® WiFi Photo Frame, Model VGF-CP1, with wireless connectivity. Ality Limited of Hong Kong manufactures and distributes a Wireless PIXXA™ digital photo frame with wireless connectivity. The DF7700 digital photo frame manufactured and distributed by Parrot SA of Paris, France, and the Vodafone 520 photo frame manufactured and distributed by Vodafone Group plc of Berkshire, England, have cellular connectivity. The DF7700 and the Vodafone 520 digital photo frames have slots for SIM cards and, as such, have their own phone numbers that can be used for sending photos to the digital photo frames.

SUMMARY OF THE DESCRIPTION

Aspects of the present invention relate to an enhanced digital photo frame to which a wireless communicator may be attached, generally by inserting the communicator into the digital photo frame such that the communicator is fully or partially enclosed therewithin. When the communicator is attached to the digital phone frame, the photo frame has the capability to make an outgoing phone call to an object appearing in a digital photo that is rendered in the photo frame; and to render digital photos that have a caller appearing therein, when an incoming phone call is received from the caller.

Embodiments of the present invention operate by joining a photo and tag database from the digital picture frame, with a contact list database from the communicator.

There is thus provided in accordance with an embodiment of the present invention a digital photo frame, including a memory for storing a plurality of digital photos, and tags associated with the digital photos, where a tag for a digital photo corresponds to an object appearing in the digital photo, a screen for displaying the digital photos, an interface for making connection with a communicator, wherein the communicator includes a storage for storing a contact list of phone numbers for objects, and a controller, coupled with the memory and the interface, for rendering one of the plurality of digital photos on the screen, and for instructing the communicator via the interface (i) to identify the phone number of a selected object, and (ii) to dial the identified phone number, in response to user activation of a tag associated with the rendered digital photo and corresponding to the selected object.

There is additionally provided in accordance with an embodiment of the present invention a method for communication using a digital photo frame, including rendering a digital photo, the digital photo having one or more tags associated therewith, wherein a tag for a digital photo corresponds to an object appearing in the photo, receiving a user input phone call command for a selected one of the tags associated with the rendered digital photo, and in response to the receiving automatically determining a phone number for the object corresponding to the selected tag, and automatically dialing the phone number for the object corresponding to the selected tag.

There is further provided in accordance with an embodiment of the present invention a method for communication using a digital photo frame, including rendering a digital photo, the digital photo having one or more tags associated therewith, wherein a tag for a digital photo corresponds to an object appearing in the photo, automatically determining phone numbers corresponding to the one or more tags, receiving a user input phone call command for a selected one of the tags associated with the rendered digital photo, and in response to the receiving, automatically dialing the phone number for the object corresponding to the selected tag.

There is yet further provided in accordance with an embodiment of the present invention a method for linking tags associated with digital photos to objects in a contact list, by a digital photo frame, including associating tags with a plurality of digital photos, where a tag for a digital photo corresponds to an object appearing in the digital photo, accessing a contact list of phone numbers for objects, automatically searching for the object corresponding to one of the tags within the contact list, and if the object corresponding to one of the tags is located within the contact list, then automatically enabling a user to assign the object's phone number to the tag, and if the object corresponding to one of the tags is not located within the contact list, then enabling a user to assign an existing object or a new object to the tag.

There is moreover provided in accordance with an embodiment of the present invention a method for linking tags associated with digital photos to objects in a contact list, by a digital photo frame, including associating a tag with a digital photo, the tag corresponding to an object appearing in the digital photo, accessing a contact list of phone numbers for objects, automatically enabling a user to assign one of the objects in the contact list to the tag, or to add a new object and phone number to the contact list and to assign the new object to the tag, and in response to the user activating the tag, automatically dialing the phone number of the object assigned to the tag.

There is additionally provided in accordance with an embodiment of the present invention a digital photo frame, including a memory for storing a plurality of digital photos, and tags associated with the digital photos, where a tag for a digital photo corresponds to an object appearing in the digital photo, a screen for displaying the digital photos, an interface for making connection with a communicator, wherein the communicator includes a storage for storing a contact list of phone numbers for objects, and a controller, coupled with the memory and the interface, for receiving a caller ID for an incoming call answered by the communicator, for identifying an object in the contact list whose phone number matches the caller ID, for identifying one or more of the plurality of digital photos that have an associated tag corresponding to the identified object, and for rendering the identified digital photos on said screen while the incoming call is in progress.

There is further provided in accordance with an embodiment of the present invention a method for communication using a digital photo frame, including receiving a caller ID for an incoming phone call, automatically determining the identity of the caller, automatically identifying one or more digital photos that have tags corresponding to the caller, wherein a tag for a digital photo corresponds to an object appearing in the photo, and automatically rendering the identified one or more digital photos while the incoming call is in progress.

BRIEF DESCRIPTION OF THE DRAWINGS

The present invention will be more fully understood and appreciated from the following detailed description, taken in conjunction with the drawings in which.

DETAILED DESCRIPTION

Figure 1:
FIG. 1 is a simplified illustration of a digital photo frame and a communicator attached thereto, in accordance with an embodiment of the present invention.

Aspects of the present invention relate to a digital photo frame with "dial-a-tag" functionality, as shown in FIG. 1 in accordance with an embodiment of the present invention. The dial-a-tag functionality is available when a communicator 400 is attached to a digital photo frame 100. The dial-a-tag functionality enables a user to make an outgoing call via communicator 400 to an object appearing in a digital photo rendered in digital photo frame 100, by simply activating a tag associated with the digital photo, where the activated tag corresponds to the object. Activation of a tag is performed by using buttons to advance through the tags associated with the rendered digital photo and selecting one of the tags. Alternatively, for digital photo frames with touch-sensitive screens, activation of a tag is performed by touching an area of the touch-sensitive screen where the object corresponding to the tag appears in the rendered digital photo.

Further aspects of the invention enable a user to manually mark areas on the digital photo frame screen, and thereby create new tags.

Yet further aspects of the present invention enable the digital photo frame to display digital photos with a caller appearing therein, when an incoming call is received from the caller via the communicator.

Figure 2:
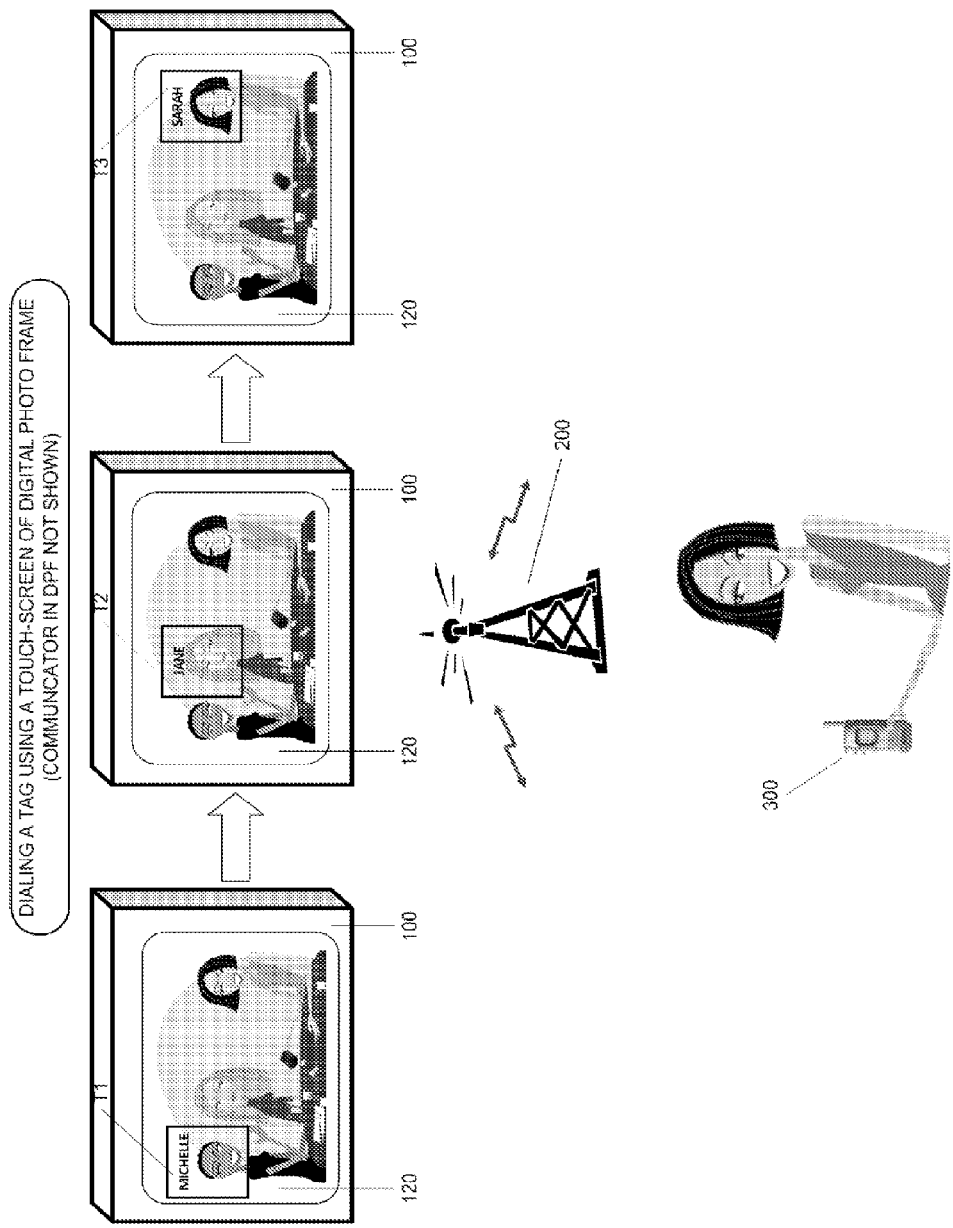
FIG. 2 is a simplified illustration of a digital photo frame with dial-a-tag functionality via a touch screen, in accordance with an embodiment of the present invention.

Reference is made to FIG. 2, which is a simplified illustration of a digital photo frame with dial-a-tag functionality via a touch screen, in accordance with an embodiment of the present invention. Shown in FIG. 2 is a digital photo frame 100 with a touch-sensitive screen 120. A wireless communicator (not shown) is attached to digital photo frame 100. The communicator makes outgoing phone calls and receives incoming phone calls. Moreover, digital photo frame 100 is able to instruct the communicator to make outgoing calls.

Touch-sensitive screen 120 is shown rendering a digital photo with three people appearing in the photo. Correspondingly, three tags were previously associated with the digital photo; namely, a tag T1 for Michelle, a tag T2 for Jane, and a tag T3 for Sarah.

If a user touches touch-sensitive screen 120 at a display area corresponding to tag T3, the digital photo frame automatically instructs the communicator to make an outgoing phone call over a wireless network 200 to Sarah's phone 300. Similarly, if the user touches touch-sensitive screen 120 at a display area corresponding to tag T1, the digital photo frame instructs the communicator to make a phone call to Michelle's phone, and similarly for tag T2. This functionality is referred to herein as "dial-a-tag" functionality.

In alternative embodiments of the present invention, touching of a tag, say tag T3, triggers sending an e-mail message to Sarah, or sending an SMS message, or sending an MMS message. Although the description hereinbelow refers to making and receiving phone calls, those skilled in the art will appreciate that other forms of communication may be sent and received, including inter alia e-mail messages, SMS messages and MMS messages.

Digital photo frame 100 is also responsive to incoming calls. When the communicator receives an incoming call over wireless network 200 from a caller's phone 300, digital photo frame 100 uses the caller ID to identify digital photos that have the caller appearing therein. Digital photo frame 100 renders the identified digital photos on screen 120 while the incoming call is in progress. Thus when the communicator receives an incoming call, say, from Sarah, digital photo frame 100 renders one or more digital photos that have Sarah appearing therein, during the call, in a slide show fashion.

As mentioned above, digital photo frame 100 may be responsive to other forms of incoming communication, including inter alia e-mail messages, SMS messages and MMS messages.

Moreover, digital photo frame 100 is responsive to conference calls. During a conference call, digital photo frame 100 displays digital photos with having some or all of the conference call participants appearing therein, in a slide show fashion.

Thus it will be appreciated that digital photo frame 100 integrates with the communicator, when the communicator is attached thereto, so as to coordinate display of digital photos with the object(s) at the other end of an outgoing or incoming call.

Figure 3:
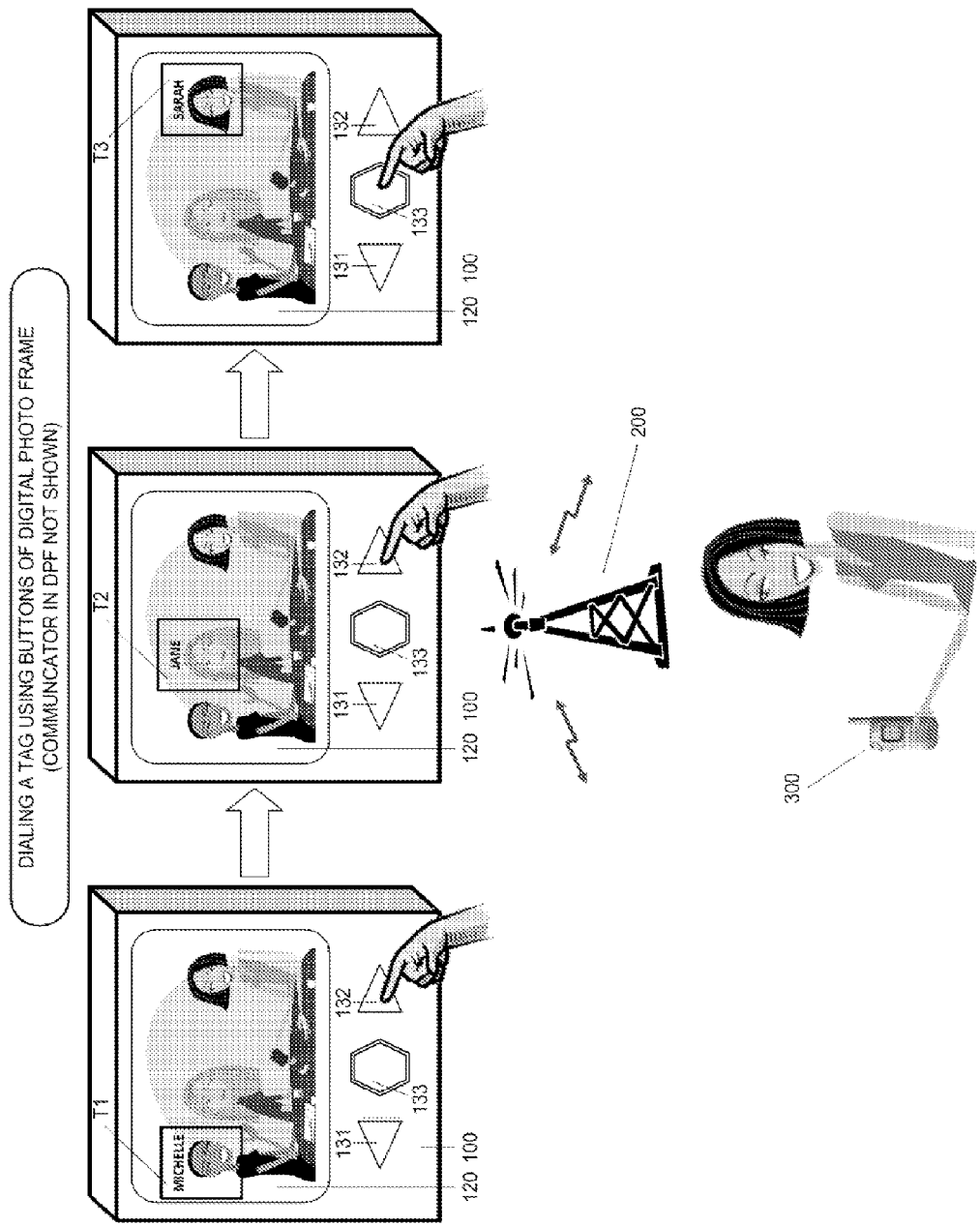
FIG. 3 is a simplified illustration of a digital frame with dial-a-tag functionality via user interface buttons, in accordance with an embodiment of the present invention.

Reference is made to FIG. 3, which is a simplified illustration of a digital frame 100 with dial-a-tag functionality via user interface buttons, in accordance with an embodiment of the present invention. As in FIG. 2, the wireless communicator (not shown) is attached to digital photo frame 100. Whereas the dial-a-tag functionality in FIG. 2 is activated by touching screen 120, the dial-a-tag functionality in FIG. 3 is activated by use of buttons 131, 132, 133. Buttons 131 and 132 are used to advance forward and backward through tags T1, T2 and T3. As shown in FIG. 3, pressing on button 132 when tag T1 is highlighted advances to tag T2. Pressing on button 132 when tag T2 is highlighted advances to tag T3. Button 133 is used to activate "dial-a-tag" for the tag currently highlighted. When button 133 is pressed with tag T3 highlighted, a phone call is made by the communicator, via wireless network 200, to Sarah's phone 300.

Regarding the wireless communicator, aspects of the present invention relate to a communicator that inserts into various "hosts". A host is defined herein to mean a device that is able to operate independently when the communicator is not inserted therewithin, and whose capabilities are enriched by the wireless communicator when the wireless communicator is inserted therewithin. Digital photo frame 100 is such a host.

Figure 4:
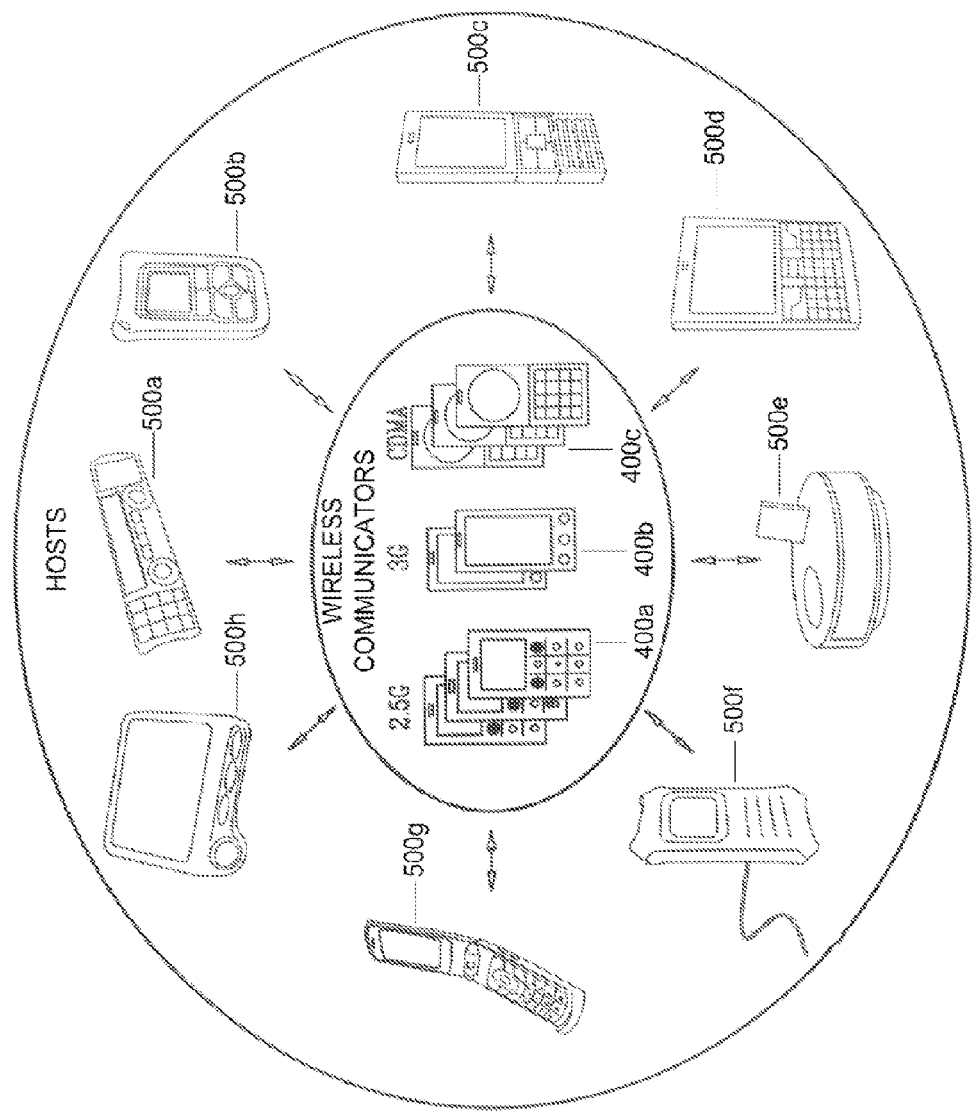
FIG. 4 is an illustration of a communication system with communicators and hosts operative in accordance with an embodiment of the present invention.

Reference is made to FIG. 4, which is an illustration of a communication system with communicators and hosts operative in accordance with an embodiment of the present invention. Shown in FIG. 4 are communicators 400a-400c, including a 2.5G communicator for a GSM network, a 3G communicator for a GSM network, and CDMA communicator for a CDMA network. It will be appreciated by those skilled in the art that the networks illustrated in FIG. 4 are exemplary of a wide variety of networks and communication protocols that are supported by the communicators of the present invention, such networks and communication protocols including inter alia WiFi, Bluetooth and WiMax.

Also shown in FIG. 4 are hosts 500a-500h. In accordance with an embodiment of the present invention, each of communicators 400a-400c may be inserted into any of hosts 500a-500h, so as to operate in combination therewith. Communicators 400a-400c are substantially of the same form factor and, as such, are able to be inserted into each of hosts 500a-500h.

Figure 5:
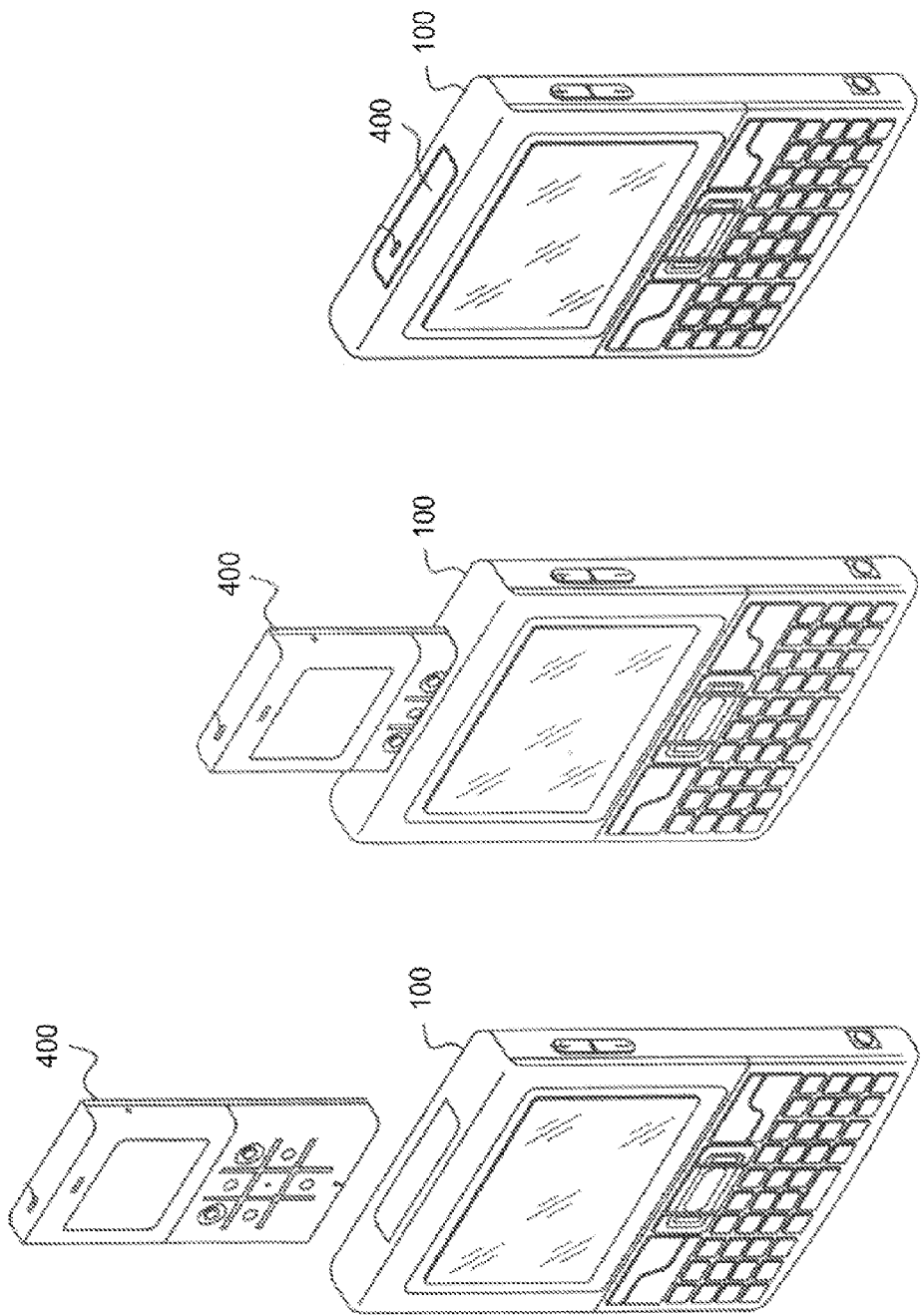
FIG. 5 is an illustration of a communicator being inserted into a host, in accordance with an embodiment of the present invention.

Reference is made to FIG. 5, which is an illustration of a communicator 400 being inserted into a host 500, in accordance with an embodiment of the present invention. Host 500 as shown in FIG. 5 includes a hollow cavity at the top for insertion of communicator 400 therewithin.

Figure 6:
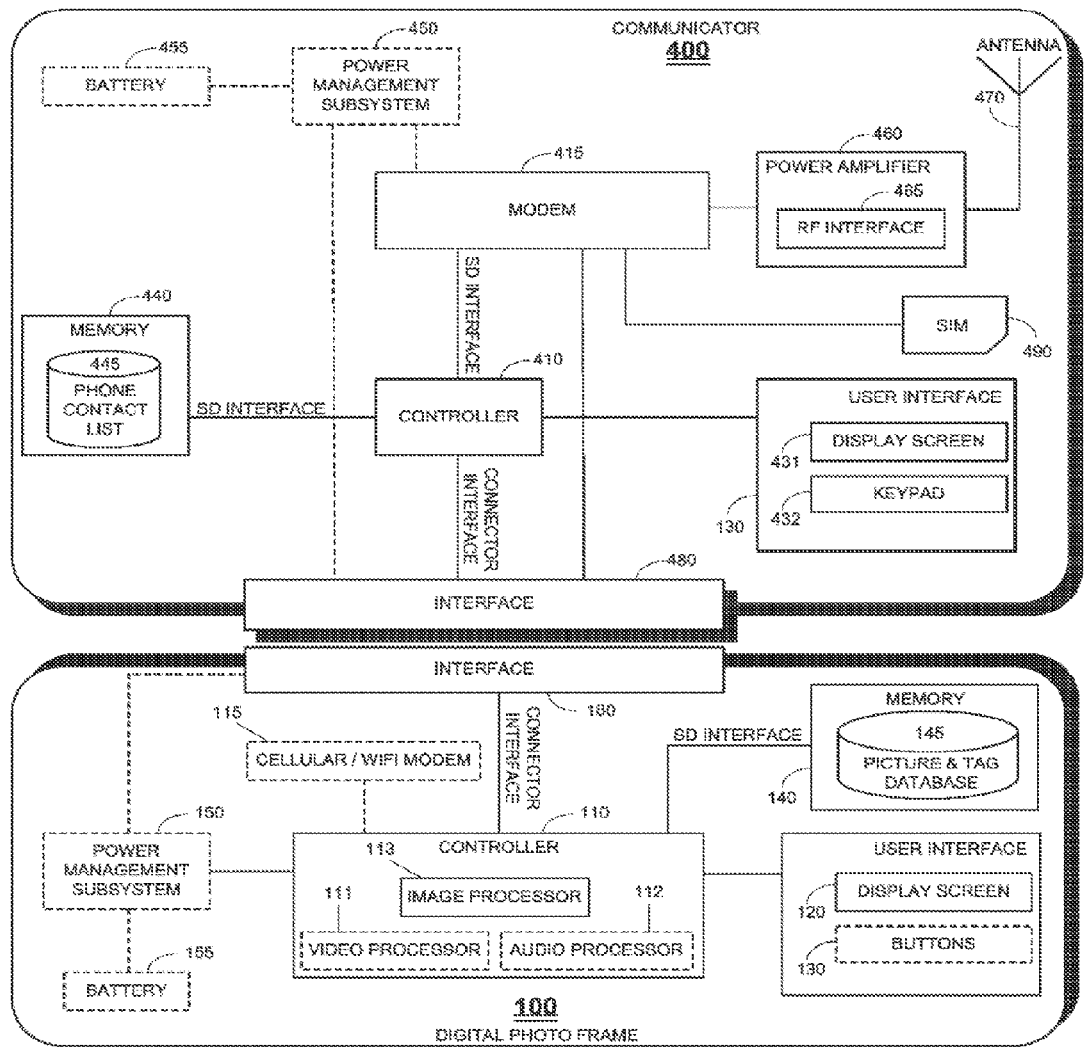
FIG. 6 is a simplified block diagram of a communicator and a digital photo frame, in accordance with an embodiment of the present invention.

Reference is made to FIG. 6, which is a simplified block diagram of communicator 400 and digital photo frame 100 in accordance with an embodiment of the present invention. Communicator 400 includes eight primary components, as follows: a controller 410, a modem 415 for sending and receiving voice and data, a user interface including a display screen 431 and a keypad 432, a memory 440, a power amplifier 460, an antenna 470, an interface 480 for connecting the communicator to digital photo frame 100 when the communicator is attached to digital photo frame 100, and a subscriber identification module (SIM) 490.

Controller 410 executes programmed instructions that control the data flow between communicator 400 and digital photo frame 100. Modem 415 controls the communication functionality of communicator 400. Memory 440 includes a contact list 445 of objects and their phone numbers. Power amplifier 460 includes a radio frequency (RF) interface 465, and is connected to antenna 470.

In accordance with an embodiment of the present invention, the interface between controller 410 and memory 440, and the interface between controller 410 and modem 415 are both SD interfaces. The interface between controller 410 and interface 480 is a custom interface. Interface 480 may connect digital photo frame 100 and communicator 400 wirelessly, or may connect them physically by electrical connection.

Communicator 400 may also include an optional power management subsystem 450, which includes charging circuitry for charging a battery 455.

In some embodiments of the present invention, communicator 400 is operable as a standalone phone. In other embodiments of the present invention, communicator 400 is not operable as a standalone phone, and may be missing some of the components shown in FIG. 6, such display screen 431 or keypad 432.

Digital photo frame 100 includes four primary components, as follows: a controller 110, a user interface including a display screen 120 and one or more buttons 130, a memory 140, and an interface 180 for connecting the digital photo frame to communicator 400 when communicator 400 is attached to the digital photo frame. Memory 140 stores a database 145 of digital photos and tags associated with digital photos. A tag associated with a digital photo corresponds to an object appearing in the photo, as shown in FIGS. 2 and 3.

Digital photo frame 100 may optionally include a cellular and/or WiFi modem 115. Controller 110 generally includes an image processor 111, and may optionally include a video processor 112 and an audio processor 113. The user interface of digital photo frame 100 may optionally include a speaker and/or a microphone, for enabling or enhancing the audio capabilities of communicator 400. Digital photo frame 100 may also include an optional power management subsystem 150 and an optional battery 155. The user interface may optionally include additional components (not shown), such as a microphone, and a mono speaker or stereo speakers.

In accordance with an embodiment of the present invention, the interface between controller 110 and storage 140 is an SD interface. The interface between controller 110 and interface 180 is a custom interface. Interface 180 may connect digital photo frame 100 and communicator 400 wirelessly, or may connect them physically by electrical connection.

Figure 7:
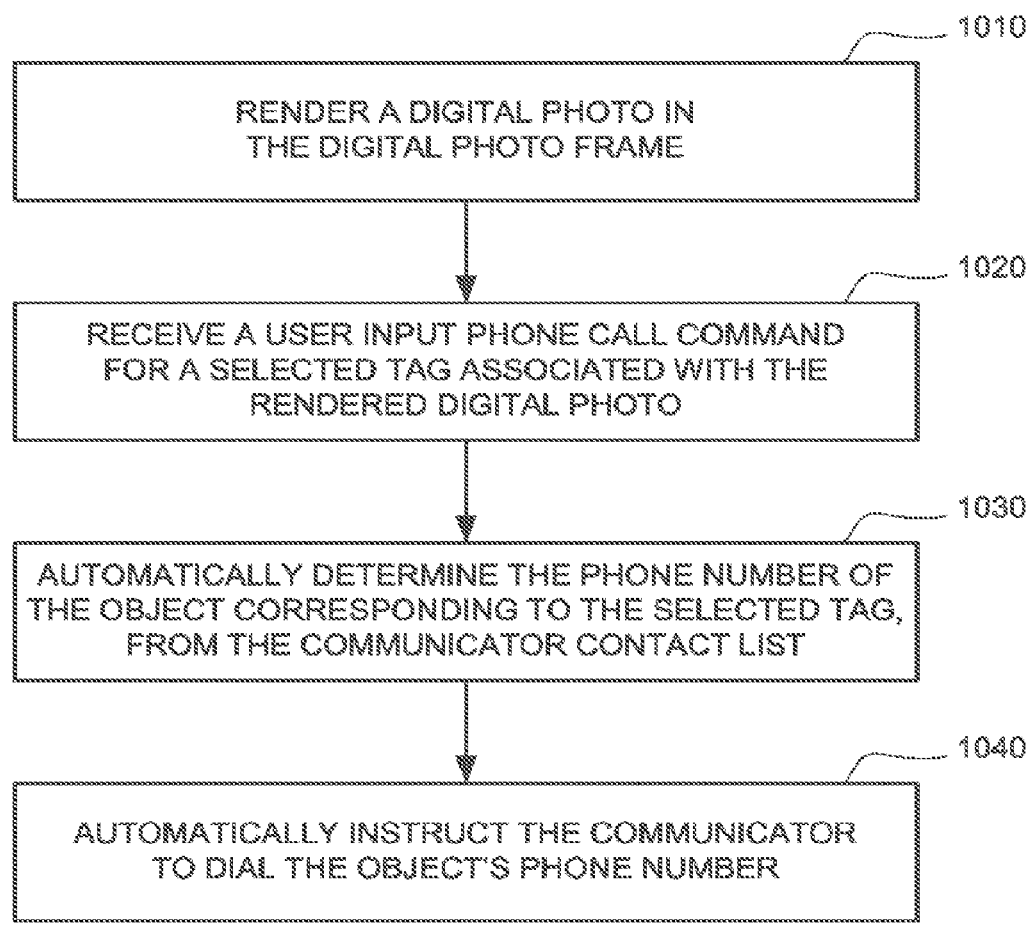
FIG. 7 is a simplified flowchart of a method of making an outgoing phone call, via a communicator, by a digital photo frame, in accordance with an embodiment of the present invention.

Reference is made to FIG. 7, which is a simplified flowchart of a method of making an outgoing phone call, via a communicator, by a digital photo frame, in accordance with an embodiment of the present invention. The steps of FIG. 7 are performed by a digital photo frame, such as digital photo frame 100 of FIG. 6.

At step 1010 the digital photo frame renders a digital photo. At step 1020 the digital photo frame receives a user input command for making an outgoing phone call, the command relating to a selected one of the tags associated with the rendered digital photo. The user command may be invoked by touching a touch-sensitive screen in an area where the selected tag is displayed, as shown in FIG. 2. Alternatively, the user command may be invoked by use of buttons to advance through the tags associated with the displayed digital photo and to select one of the tags, as shown in FIG. 3.

At step 1030 the digital photo frame automatically determines a phone number for the object corresponding to the tag selected at step 1020. In one embodiment of the present invention, step 1030 is performed using a join of two databases; namely, a database of photos and tags stored in the digital photo frame, and a database of objects and phone numbers stored in the communicator.

Figure 8:
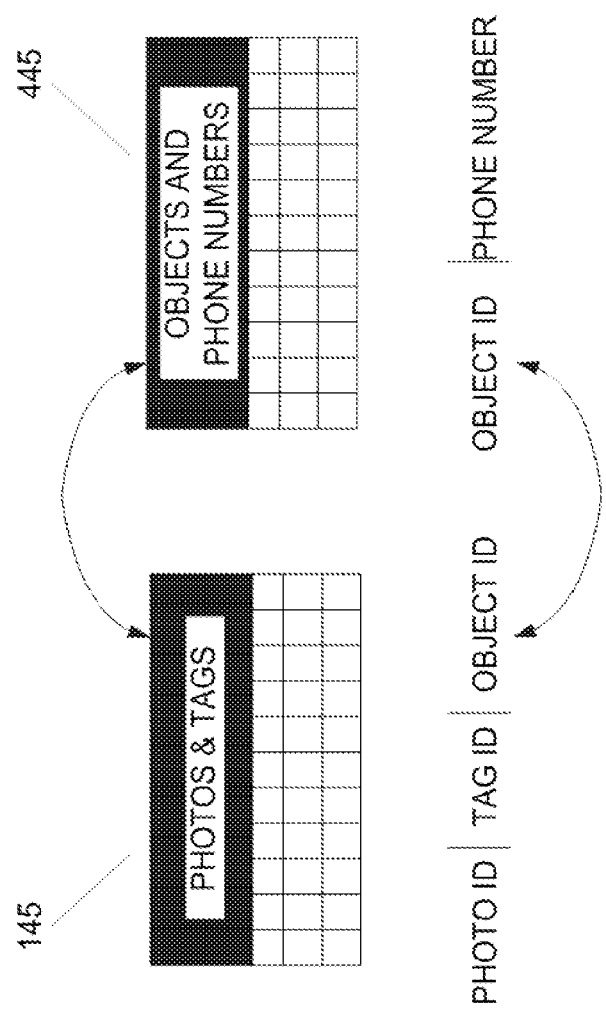
FIG. 8 is a simplified diagram of joining of a digital photo database for a digital photo frame with a contact list database for a communicator, in accordance with an embodiment of the present invention.

In this regard, reference is made to FIG. 8, which is a simplified diagram of joining of a digital photo database 145 for a digital photo frame with a contact list database 445 for a communicator, in accordance with an embodiment of the present invention. Digital photo database 145 includes inter alia fields for a photo ID, a tag ID and an object ID. The photo ID is an identifier for one of the digital photos stored in the digital photo frame. The tag ID is an identifier for one of the tags associated with the digital photo identified by the photo ID. The object ID is an identifier for the object corresponding to the tag referenced by tag ID. Contact list database includes inter alia fields for an object ID and a phone number. The object ID is an identifier for an object.

Databases 145 and 445 may be joined by matching an object ID in a record of database 145 with an object ID in a record of database 445. When the databases are joined, the digital photo frame is able to retrieve a phone number of the object corresponding to a tag of a digital photo. At step 1040 of FIG. 7 the digital photo frame automatically instructs the communicator to dial the retrieved phone number and support a phone conversation, thereby enabling the dial-a-tag functionality of the present invention. In an embodiment of the present invention, the digital picture frame includes a speaker and microphone, to enable or enhance the audio capabilities of the communicator.

Figure 9:
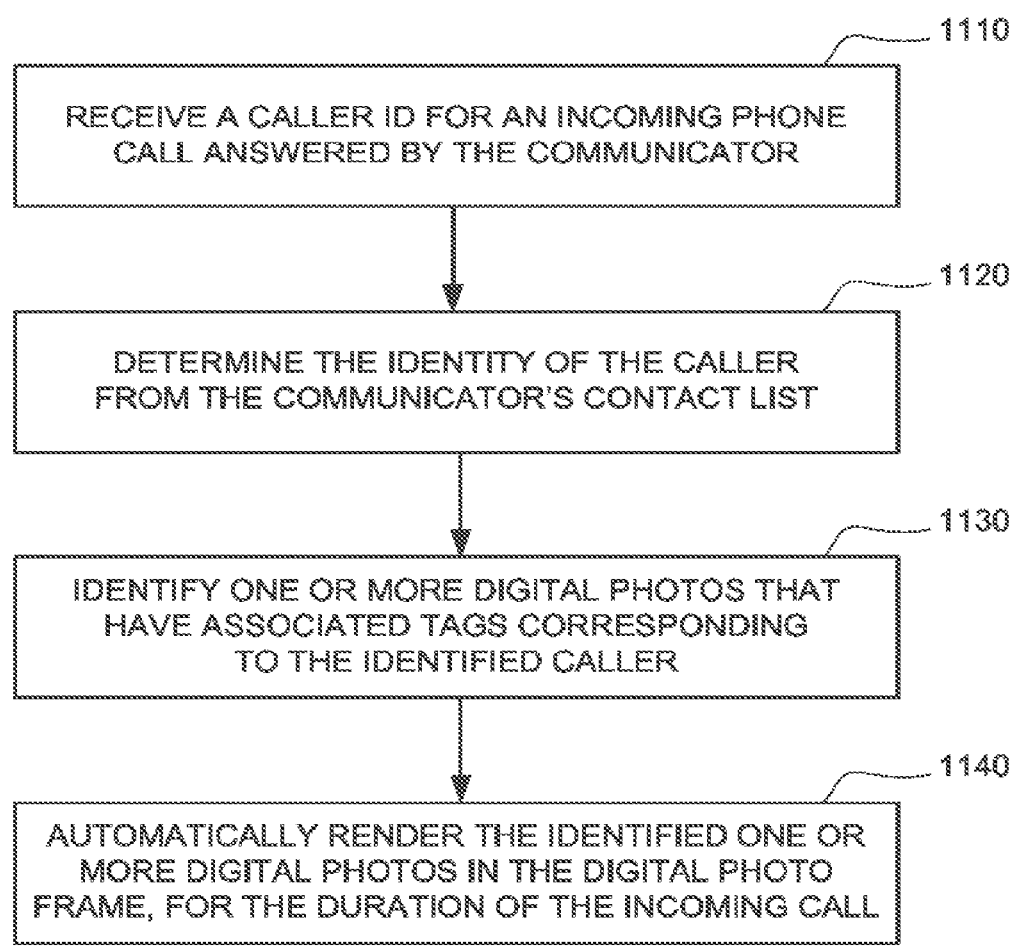
FIG. 9 is a simplified flowchart of a method of receiving an incoming phone call, via a communicator, by a digital photo frame, in accordance with an embodiment of the present invention.

Reference is made to FIG. 9, which is a simplified flowchart of a method of receiving an incoming phone call, via a communicator, by a digital photo frame, in accordance with an embodiment of the present invention. The steps of FIG. 9 are performed by a digital photo frame, such as digital photo frame 100 of FIG. 6.

The communicator receives an incoming phone call, and obtains a caller ID. At step 1110 the digital photo frame receives the caller ID from the communicator. At step 1120 the digital photo frame identifies the caller from the communicator's contact list. At step 1130 the digital photo frame identifies one or more digital photos that have associated tags corresponding to the caller identified at step 1120. In one embodiment of the present invention, steps 1120 and 1130 are performed using the joined database shown in FIG. 8. Specifically, the joined database enables the digital photo frame to identify records for digital photos in database 145 that are joined with the record in database 445 having a phone number that matches the caller ID received at step 1110. It is noted that steps 1120 and 1130 are substantially reverse to step 1030 where a phone number is identified from a tag.

Finally, at step 1140 the digital photo frame renders the one or more digital photos identified at step 1130 in a slide show fashion, for the duration of the incoming call. The user of the digital photo frame is thus able to view photos of the object that is calling him.

Figure 10:
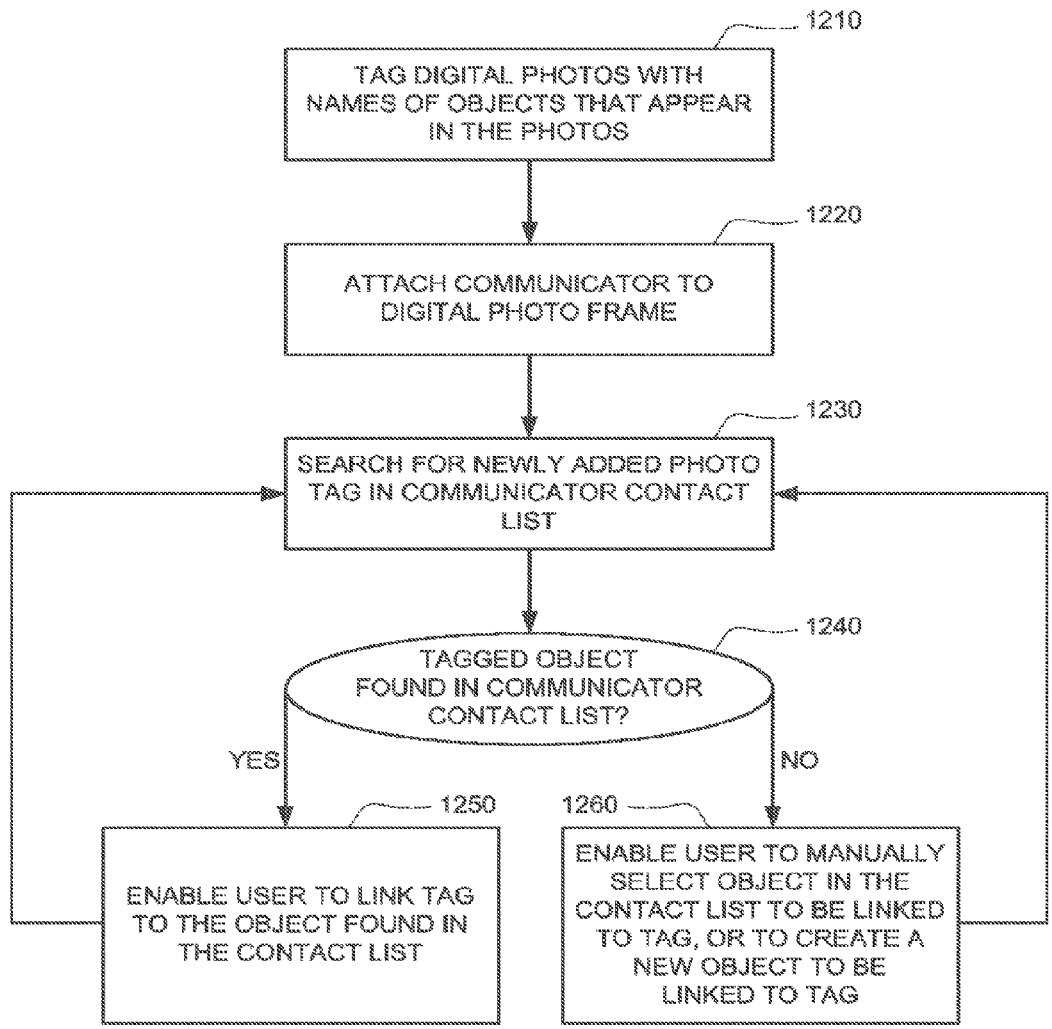
FIG. 10 is a simplified flowchart of a method for tagging objects appearing in photos when a communicator is not attached to a digital photo frame, and linking the photo tags to phone numbers when the communicator is subsequently attached to the digital photo frame, in accordance with an embodiment of the present invention.

Reference is made to FIG. 10, which is a simplified flowchart of a method for tagging objects appearing in photos when a communicator is not attached to a digital photo frame, and linking the photo tags to phone numbers when the communicator is subsequently attached to the digital photo frame, in accordance with an embodiment of the present invention. At step 1210 a user tags digital photos with tags corresponding to objects that appear in the photos. Step 1210 may be performed by means of the digital photo frame, or by means of any computing device that enables photo tagging.

At step 1220 the communicator is attached to the digital photo frame. At step 1230 the digital photo frame processes newly added tags that are not currently linked to phone numbers. For each such tag, the object corresponding to the tag is searched for in the communicator's contact list. In one embodiment of the present invention, step 1230 is performed by trying to match the object ID of the record for the tag in database 145, with the object ID of a record in database 445. If a match is found, as determined at step 1240, then at step 1250 the digital photo frame enables the user to link the phone number of the object ID with the tag. The linked phone number would then be the phone number called by the dial-a-tag functionality when the tag is activated.

Otherwise, if a match is not found, as determined at step 1240, then at step 1260 the digital photo frame enables the user to select a record from database 445 to match with the tag. The phone number in the selected record is then linked to the tag. Alternatively, the user may create a new record in database 445 to match with the tag. The phone number in the newly created record is then linked to the tag. After step 1250 or 1260, the method returns to step 1230 to process a next currently unlinked tag, for linking a phone number thereto.

The digital photo frame also enables the user to change a phone number currently linked with a tag, to a different phone number.

Figure 11:
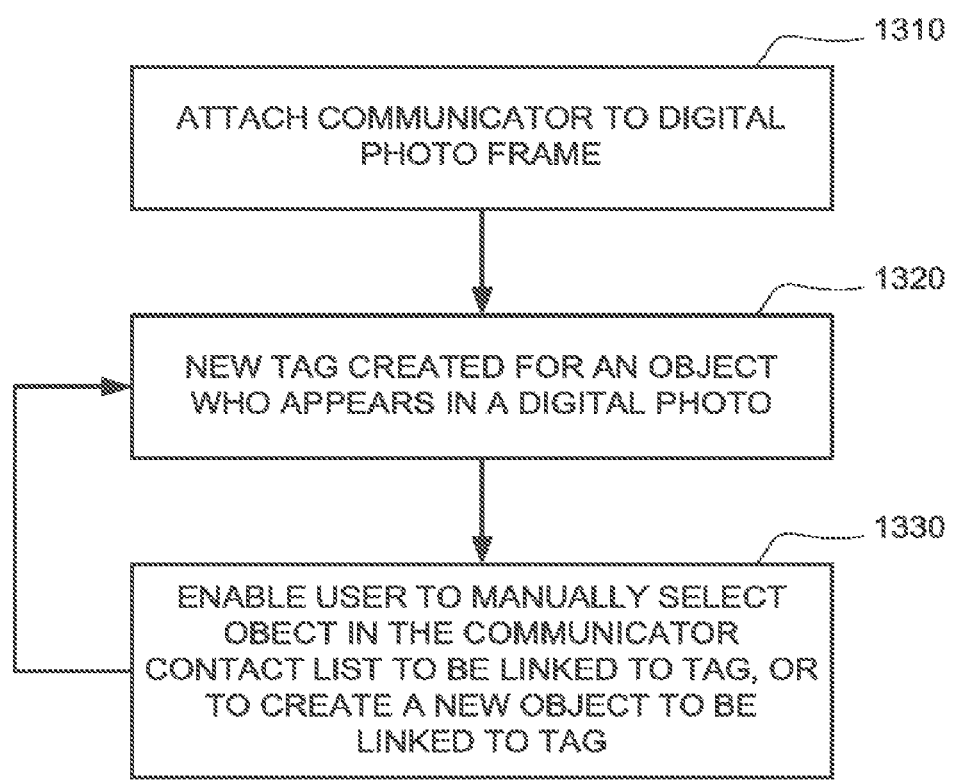
FIG. 11 is a simplified flowchart of a method for tagging objects appearing in photos and linking the photo tags to phone numbers, when a communicator is attached to a digital photo frame, in accordance with an embodiment of the present invention.

Reference is made to FIG. 11, which is a simplified flowchart of a method for tagging objects appearing in photos and linking the photo tags to phone numbers, when a communicator is attached to a digital photo frame, in accordance with an embodiment of the present invention. At step 1310 the communicator is attached to the digital photo frame. At step 1320 the digital photo frame enables a user to create a new tag for a digital photo. At step 1330 the digital photo frame enables the user to select an object from the communicator's contact list. The phone number of the selected object is then linked to the new tag. Alternatively, the user may create a new object. The phone number of the newly created object is then linked to the new tag. The method then returns to step 1320 to create a next new tag.

In reading the above description, persons skilled in the art will appreciate that there are many apparent variations that can be applied to the methods and systems described. One such variation is, after joining the databases 145 and 445 (FIG. 8), storing the phone numbers of objects corresponding to tags in digital photo frame database 145. In this case, the methods of FIGS. 7 and 9 are performed without the need to access the contact list of the mobile communicator.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for communication using a digital photo frame, comprising:
   rendering a pre-tagged digital photo with a plurality of different objects appearing in the photo, the digital photo having one or more keyword photo-tags associated therewith, wherein a keyword photo-tag for a digital photo corresponds to an object appearing in the photo;
   receiving a user input phone call command for any selected one of the keyword photo-tags associated with the rendered digital photo, via one or more buttons that enable the user to advance through the tagged objects, and to select one of them; and
   in response to said receiving:
      automatically determining a phone number for the object corresponding to the selected keyword photo-tag; and
      automatically dialing the phone number for the object corresponding to the selected keyword photo-tag.

2. The method of claim 1 wherein keyword photo-tags correspond to objects taken from the group consisting of people, business establishments, organizations, governments and municipalities, geographical sites, entertainment services and information services.

3. The method of claim 1 wherein said rendering comprises rendering the digital photo on a touch-sensitive screen, and wherein said receiving a user input phone call command comprises identifying an area of the touch-sensitive screen touched by the user, the area corresponding to the selected keyword photo-tag.

4. The method of claim 1 wherein said automatically determining comprises automatically locating the phone number for the object corresponding to the selected keyword photo-tag within a contact list of phone numbers for objects.

5. A method for communication using a digital photo frame, comprising:
   rendering a pre-tagged digital photo with a plurality of different objects appearing in the photo, the digital photo having one or more keyword photo-tags associated therewith, wherein a keyword photo-tag for a digital photo corresponds to an object appearing in the photo;
   automatically determining phone numbers corresponding to the one or more keyword photo-tags;
   receiving a user input phone call command for any selected one of the keyword photo-tags associated with the rendered digital photo, via one or more buttons that enable the user to advance through the tagged objects, and to select one of them; and
   in response to said receiving, automatically dialing the phone number for the object corresponding to the selected keyword photo-tag.

6. The method of claim 5 wherein keyword photo-tags correspond to objects taken from the group consisting of people, business establishments, organizations, governments and municipalities, geographical sites, entertainment services and information services.

7. The method of claim 5 wherein said rendering comprises rendering the digital photo on a touch-sensitive screen, and wherein said receiving a user input phone call command comprises identifying an area of the touch-sensitive screen touched by the user, the area corresponding to the selected keyword photo-tag.

8. The method of claim 5 wherein said automatically determining comprises automatically locating the phone numbers for the objects corresponding to the one or more keyword photo-tags within a contact list of phone numbers for objects.

9. A method for linking keyword tags associated with digital photos to objects in a contact list, by a digital photo frame, comprising:
   associating keyword photo-tags with a plurality of digital photos, where each digital photo comprises a plurality of different objects appearing therein, and where a keyword photo-tag for a digital photo corresponds to an object appearing in the digital photo;
   accessing a contact list of phone numbers for objects;
   automatically searching for the object corresponding to one of the keyword photo-tags within the contact list; and
      if the object corresponding to one of the keyword photo-tags is located within the contact list, then automatically enabling a user to assign the object's phone number to the keyword photo-tag; and
      if the object corresponding to one of the keyword photo-tags is not located within the contact list, then enabling a user to assign an existing object or a new object to the keyword photo-tag.

10. A method for linking keyword tags associated with digital photos to objects in a contact list, by a digital photo frame, comprising:
   for each of a plurality of objects appearing in a digital photo:

associating a keyword photo-tag with the digital photo, the keyword photo-tag corresponding to the object;
accessing a contact list of phone numbers for objects; and
automatically enabling a user to assign one of the objects in the contact list to the keyword photo-tag, or to add a new object and phone number to the contact list and to assign the new object to the keyword photo-tag; and
in response to the user activating any one of the keyword photo-tags, automatically dialing the phone number of the object assigned to that keyword photo-tag.

* * * * *